United States Patent [19]

Muraoka

[11] Patent Number: 4,974,874
[45] Date of Patent: Dec. 4, 1990

[54] AIR BAG SYSTEM FOR A MOTOR VEHICLE

[75] Inventor: Kunihiko Muraoka, Isezaki, Japan

[73] Assignee: Fuji Jukogyo Kabushiki Kaisha, Tokyo, Japan

[21] Appl. No.: 431,622

[22] Filed: Nov. 3, 1989

[30] Foreign Application Priority Data

Nov. 9, 1988 [JP] Japan .............................. 63-146969[U]

[51] Int. Cl.$^5$ ............................................. B60R 21/32
[52] U.S. Cl. .................................................... 280/735
[58] Field of Search ............... 280/727, 728, 731, 734, 280/735; 340/438, 436

[56] References Cited

U.S. PATENT DOCUMENTS

| | | | |
|---|---|---|---|
| 3,774,151 | 11/1973 | Lewis et al. | 280/735 |
| 4,673,912 | 6/1987 | Kumasaka et al. | 280/735 |
| 4,836,795 | 6/1989 | Schauer | 280/731 |
| 4,844,359 | 7/1989 | Kato | 280/731 |

FOREIGN PATENT DOCUMENTS 62-32926 8/1987 Japan .

Primary Examiner—Charles A. Marmor
Assistant Examiner—Tamara L. Finlay
Attorney, Agent, or Firm—Martin A. Farber

[57] ABSTRACT

A pair of g-responsive first parallel sensors and a pair of g-responsive second parallel sensors provided in a motor vehicle. An inflator is mounted on a steering wheel of the vehicle and cruise operating switches are provided on the steering wheel. An air bag circuit is from a first source to a ground passing through the first parallel sensors, a pair of first parallel leads in a connector provided on the steering wheel, inflator, a pair of second parallel leads in the connector, and the second parallel sensors. A cruise operating circuit is from a second source to the ground passing through a lead in the connector, cruise switches, and the second parallel leads, so that the second parallel leads are common to the air bag circuit and the cruise operating circuit.

2 Claims, 2 Drawing Sheets

AIR BAG SYSTEM FOR A MOTOR VEHICLE

BACKGROUND OF THE INVENTION

The present invention relates to an air bag system installed in a motor vehicle for protecting the driver and passenger in case of a front-end crash of the vehicle, and more particularly to a circuit for operating the air bag system.

An air bag is folded and packed in a housing mounted on a steering wheel or on a dash board of the motor vehicle. During a crash, the air bag inflates in a fraction of a second in accordance with a signal from a g-responsive sensor or a deceleratometer so as to protect the driver and passenger. In order to inflate the air bag, an inflator is provided on the steering wheel. The inflator has a squib as a heating element, and an air bag operating circuit including a source, a g-responsive sensor, and a connector for electrically connecting these components to each other. At a crash, a current from the source is supplied to the squib to heat gas in the inflator to explode it, so that the air bag is inflated.

FIG. 2 shows a conventional air bag operating circuit. An inflator 1 is provided on a steering wheel. Further, a horn switch 2, and a cruise control switch comprising a set switch 3a and a resume switch 3b are provided on the steering wheel.

On a vehicle body, a pair of first g-responsive sensors 5a and 5b are provided in the inside of the vehicle and a pair of second g-responsive sensors 6a and 6b are provided on side frames in a front portion of the vehicle body for detecting a crash of the vehicle. A horn 8, a relay coil 7a and a relay switch 7b and a cruise control unit 9 are further provided. A connector 25 is provided on the steering wheel for electrically connecting the components on the steering wheel and vehicle body. The connector 25 comprises a reel having a case 25a secured to a fixed portion such as a steering column and a shaft 25b secured to a steering wheel. A flat cable having a plurality of leads is loosely wound by few turns on the shaft 25b. An end of the inflator 1 is connected to a lead 10a of the cable in the connector 25, and further connected to a source B1 through sensors 5a and 5b. The other end of the inflator 1 is connected to the ground through a lead 10b and sensors 6a and 6b. The horn switch 2 is connected to the ground at an end thereof and the other end of the switch 2 is connected to another source B2 through a lead 10c and the relay coil 7a. The relay switch 7b is connected to the source B2 and to the horn 8. The set switch 3a and the resume switch 3b are parallely arranged each other and connected to the lead 10c in series and to the cruise control unit 9 through leads 10d and 10e. Input terminals of the cruise control unit 9 are connected to the ground through respective resistors having comparatively large values (2K Ω). Thus, when one of the switches 3a and 3b is closed, the current flowing the relay coil 7a reduces, thereby preventing the switch 7b from closing.

The conventional air bag system comprises a single circuit including the sensors 5a, 5b, lead 10a, inflator 1, lead 10b, and sensors 6a, 6b. If the circuit is disconnected, the current does not flow in the inflator 1, so that the air bag may not operate.

In order to solve such a serious problem, it may be proposed that a circuit is connected to the single air bag circuit in parallel. Such an addition of the circuit increases the number of leads from five to seven. However, since the space in the reel is small, it is difficult to house the increased lead in the case 25a.

SUMMARY OF THE INVENTION

The object of the present invention is to provide an air bag system which may ensure the safety of the system without increasing the number of leads in a connector of the circuit.

According to the present invention, there is provided an air bag system for a motor vehicle comprising a pair of g-responsive first parallel sensors provided in the motor vehicle at a position, a pair of g-responsive second parallel sensors provided in the motor vehicle at another position, an inflator provided on a steering wheel of the vehicle, switches provided on the steering wheel for operating an operating system mounted on the vehicle, a connector having a plurality of leads and mounted on the steering wheel so as to permit the rotation of the steering wheel, keeping electrical connection between components on the steering and components mounted on the vehicle, an air bag circuit from a first source to a ground passing through the first parallel sensors, a pair of first parallel leads in the connector, inflator, a pair of second parallel leads in the connector, and the second parallel sensors, an operating circuit from a second source to the ground passing through a lead in the connector, the switches, and the second parallel leads, a pair of diodes provided in the air bag circuit so as to separate the operating circuit from the air bag circuit.

In an aspect of the invention, the operating circuit is a cruise control circuit, and the switches are a set switch and a resume switch.

The other objects and features of this invention will become understood from the following description with reference to the accompanying drawings.

BRIEF DESCRIPTION OF THE PREFERRED EMBODIMENT

DETAILED DESCRIPTION OF THE PREFERRED EMBODIMENT

Figure 1:
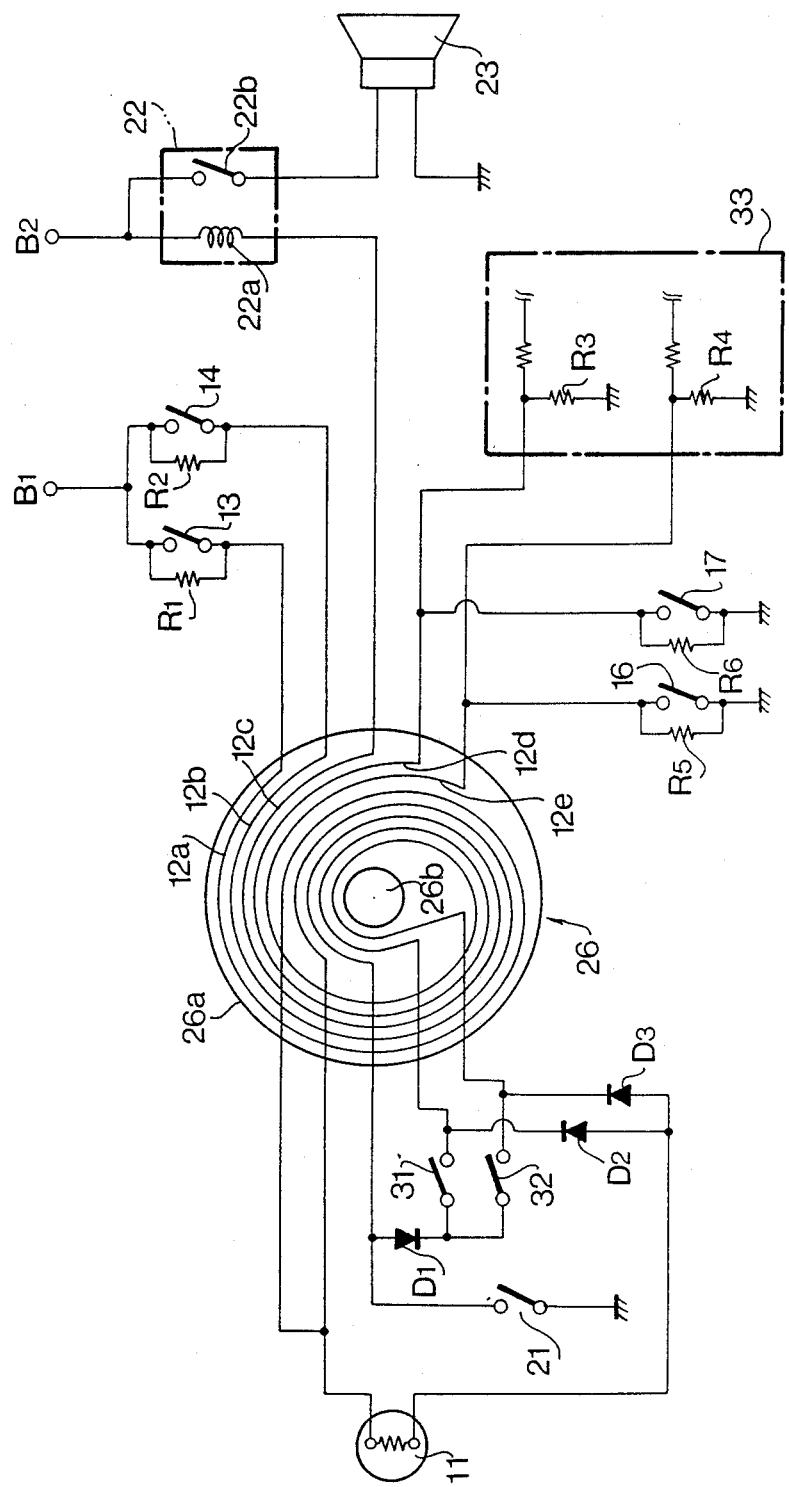
FIG. 1 shows an air bag system according to the present invention.
Figure 2:
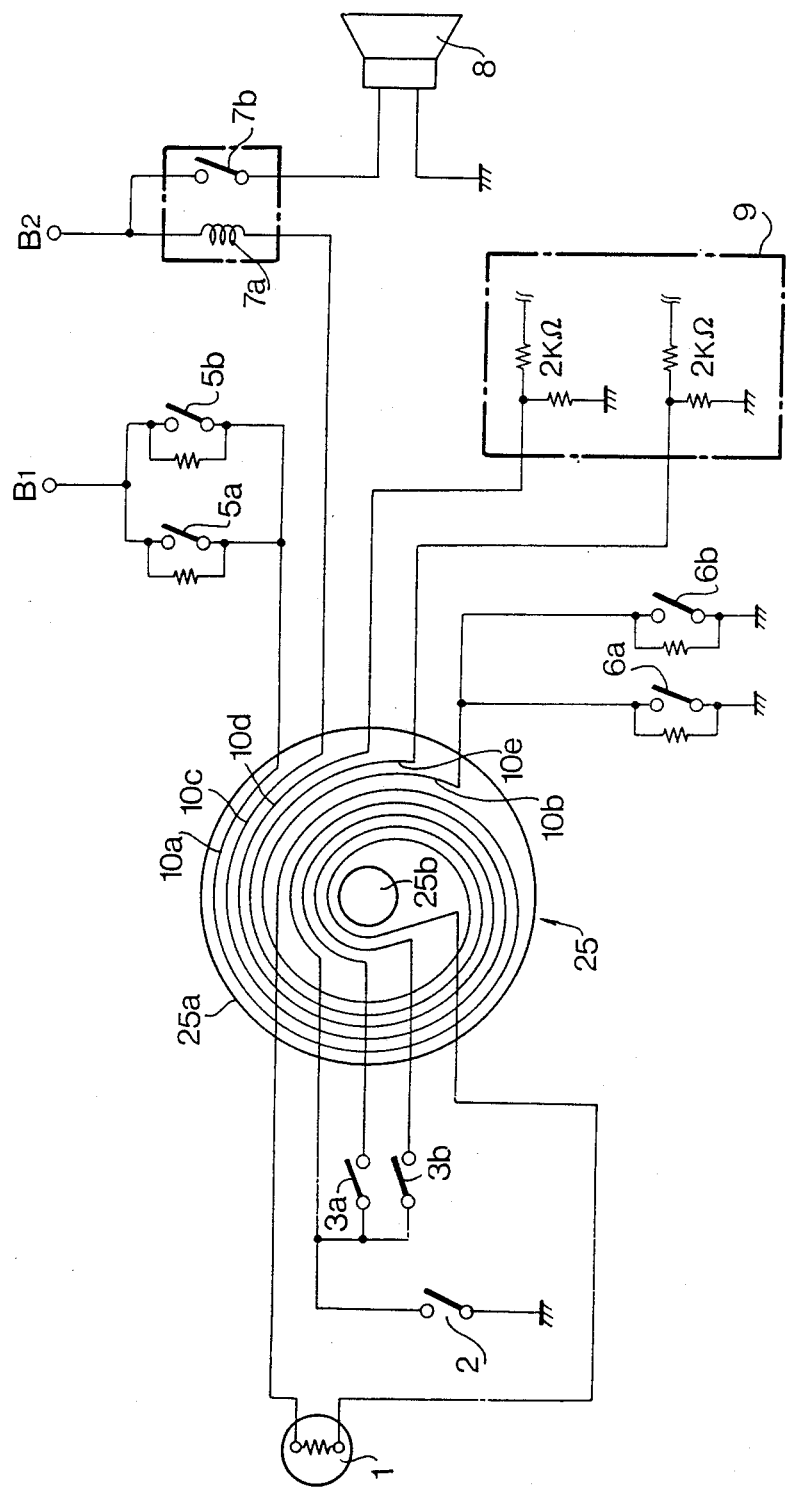
FIG. 2 shows a conventional air bag system.

Referring to FIG. 1, a horn switch 21 is connected to a lead 12c of a connector 26 at an end thereof and the other end of the switch 21 is connected to the ground. The lead 12c is connected to a coil 22a of a relay 22, which is in turn connected to the source B2. A switch 22b of the relay 22 is connected to a horn 23 and the source B2.

A parallel set switch 31 and a resume switch 32 of a cruise control switch are connected to the lead 12c through a diode D1. The set switch 31 and the resume switch 32 are connected to leads 12a and 12e which are connected to a cruise control unit 33 and to the ground through resistors R3 and R4, respectively.

In accordance with the present invention, an end of an inflator 11 is connected to a pair of parallel leads 12a and 2b of a connector 26, and the other end is connected to the parallel leads 12d and 12c through diodes D2 and D3, respectively. Leads 12a and 12b are connected to source B1 through a pair of parallel g-responsive sensors 13 and 14 provided in the room of a vehicle. Resistors R1 and R2 are parallel with the sensors 13 and 14, respectively. The leads 12d and 12e are connected to the ground through a pair of g-responsive sensors 16 and 17 provided in front portions of a vehicle body. A pair of resistors R5 and R6 are connected to the respective sensors 16 and 17 in parallel.

Thus, the air bag system of the present invention has parallel circuits for operating the inflator 11. More particularly, the inflator 11 is connected to sensors 13 and 14 through parallel leads 12a and 12b and to sensors 16 and 17 through parallel leads 12d and 12e. Since the leads 12d and 12e are common to the air bag circuit and the cruise control circuit, the number of leads does not increase.

At a crash, if at least one of sensors 13 and 14 and at least one of sensors 16 and 17 are turned on at the same time, a current flows in the inflator 11, so that the inflator 11 operates to inflate the air bag.

When one of the leads 12a and 12b is short-circuited to the ground and one of the cruise control switch 31 or 32 is closed, a circuit from the source B2 to the ground passing through coil 22a, diode D1, switch 31 or 32, diode D2 or D3, and inflator 11 is formed. However, the diode D2 or D3 prevent a current from flowing in the circuit to prevent the operation of the inflator. In addition, the diodes D2 and D3 act to separate the cruise control circuit from the air bag circuit so that the circuit operates reliably.

The g-responsive sensors 13 and 14 provided in the room are adapted to operate at a smaller G than the sensors 16 and 17. Therefore, it may occur that the horn switch 21, one of cruise control switches 31 and 32, and one of sensors 13 and 14 are closed at the same time, and an inflator operating circuit passing through these switch and sensor is formed. However, the diode D1 prevents a current from flowing in the inflator 11.

In accordance with the present invention, the air bag system comprises parallel circuits. Therefore, even if one of the circuits is disconnected, the other circuit operates the inflator to inflate the air bag. Accordingly, the safety of the air bag system is ensured.

Since the number of leads in the connector does not increase, the connector is small in size. Thus, the difficulty in mounting the connector on the steering wheel does not arise.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An air bag system for a motor vehicle comprising:
a pair of g-responsive first parallel sensors provided in the motor vehicle at a position;
a pair of g-responsive second parallel sensors provided in the motor vehicle at another position;
an inflator provided on a steering wheel of the vehicle;
switches provided on the steering wheel for operating an operating system mounted on the vehicle;
a connector having a plurality of leads and mounted on the steering wheel so as to permit the rotation of the steering wheel, keeping electrical connection between components on the steering wheel and components mounted on the vehicle;
an air bag circuit from a first source to a ground passing through the first parallel sensors, a pair of first parallel leads in the connector, inflator, a pair of second parallel leads in the connector, and the second parallel sensors;
an operating circuit from a second source to the ground passing through a lead in the connector, said switches, and said second parallel leads;
a pair of diodes provided in the air bag circuit so as to separate the operating circuit from the air bag circuit 2. The system according to claim 1 wherein the operating circuit is a cruise control circuit, and the switches are a set switch and a resume switch.

* * * * *